United States Patent [19]

Hirama et al.

[11] Patent Number: 5,604,028
[45] Date of Patent: Feb. 18, 1997

[54] MAGNETIC RECORDING MEDIA HAVING A MAGNETIC LAYER INCLUDING ACICULAR MAGNETIC METAL POWDER AND ALUMINA POWDER

[75] Inventors: Makoto Hirama, Ibaraki-ken; Shigeru Ishikawa, Yokohama, both of Japan

[73] Assignee: Victor Company of Japan, Ltd., Yokohama, Japan

[21] Appl. No.: 512,543

[22] Filed: Aug. 8, 1995

[30] Foreign Application Priority Data

Aug. 10, 1994 [JP] Japan .................................. 6-210598

[51] Int. Cl.⁶ .................................................. G11B 5/708
[52] U.S. Cl. ...................... 428/323; 428/328; 428/329; 428/332; 428/694 BN; 428/900
[58] Field of Search ............................ 428/323, 328, 428/329, 332, 694 BN, 900

[56] References Cited

U.S. PATENT DOCUMENTS

| | | | |
|---|---|---|---|
| 4,460,651 | 7/1984 | Hosaka et al. | 428/402 |
| 4,756,962 | 7/1988 | Takamatsu et al. | 428/329 |
| 4,803,121 | 2/1989 | Ryoke et al. | 428/329 |

FOREIGN PATENT DOCUMENTS

| | | |
|---|---|---|
| 1-201822 | 8/1989 | Japan . |
| 3-77574 | 4/1991 | Japan . |

OTHER PUBLICATIONS

Derwent Database WPIL 88-253 416 Abstract Jul. 1988.
Derwent Database WPIL 90-120 393 Abstract Mar. 1990.
Derwent Database WPIL 90-120 392 Abstract Mar. 1990.

*Primary Examiner*—Stevan A. Resan
*Attorney, Agent, or Firm*—Michael N. Meller

[57] ABSTRACT

The present invention provides a magnetic recording medium having excellent durability, high abrasive resistance and smoothness capable of suppressing development of uneven wear on a tape contact surface of a magnetic head at minimum. The magnetic recording medium has a base film and a magnetic layer provided on the base film. The magnetic layer includes metal magnetic powder of particles having an average long axis length of not more than 0.13 µm, alumina powder of particles which have an average diameter of not more than 0.13 µm, an α-rate of not more than 30% and pH of not more than 7.0, and a binder resin.

6 Claims, 1 Drawing Sheet

MAGNETIC RECORDING MEDIA HAVING A MAGNETIC LAYER INCLUDING ACICULAR MAGNETIC METAL POWDER AND ALUMINA POWDER

BACKGROUND OF THE INVENTION

1. Field of the Invention

This invention relates to improvements of a magnetic recording medium used for a magnetic recording and/or reproducing apparatus, and it particularly relates to a coated-type magnetic recording medium having an excellent durability and surface flatness capable of suppressing development of uneven wear minimal on a tape contact surface of a magnetic head.

2. Description of the Related Arts

Presently, a magnetic recording medium such as a magnetic tape used for video tape recorders (referred to as VTR) or audio tape recorders is constructed by coating magnetic paint on a surface of a base film to form a magnetic layer on which information signals are to be recorded by magnetic heads. For the purpose of improving durability and abrasive resistance of the magnetic layer of the magnetic tape, non-magnetic particles selected from $Al_2O_3$, $Cr_2O_3$ and $\alpha$-$Fe_2O_3$ particles each having a Mohs hardness of more than 6 are added in the magnetic layer as abrasives or abrasive resistance additives.

As well known, these abrasives are effective to improve the durability and abrasive resistance characteristic of the magnetic tape, on the other hand, they polish and abrade a tape contact surface of the magnetic head. Thanks to the abrasive ability of the magnetic tape, such stains and foreign matters closely adhered to the tape contact surface of the magnetic head as magnetic particles along with binder separated from the magnetic layer are effectively removed by running the magnetic tape containing the abrasives along the tape contact surface thereof.

Along with magnetic recording mediums employing conventional oxide iron powder as magnetic powder, a ferrite magnetic head has been widely used as a recording and reproducing magnetic head so far. However, upon emergence of metal tapes having a higher coercive force (Hc), a metal type magnetic head (referred to as a metal head hereinafter) such as a Metal in Gap type head (referred to as MIG head), a metal laminated type head or a thin film type head is used in place of the ferrite magnetic head. Usually, the tape contact surface of the metal head is composed of a plurality of different materials each having a different hardness from one another. When the metal head is used for the magnetic tape containing the conventional abrasive made of particles each having a high mohs hardness such as alumina powder of which particles have a high $\alpha$-rate ($\alpha$-rate designates a degree of crystallization as mentioned hereinafter), the metal head tends to suffer from uneven wear in which wear occurs locally in metal materials having a lower hardness than those of other materials on the tape contact surface. Thus, the output level of the metal head is decreased upon reproducing recorded signal from the magnetic tape because of a spacing loss due to the uneven wear. Further, head cracks may be produced in the tape contact surface in the worst case.

Specifically, in the conventional ferrite head, the tape contact surface is composed of bonding glass portions and ferrite core portions which have a higher abrasive resistance than that of the bonding glass portions. Thus, even when the uneven wear occurs on the tape contact surface, the amount of wear is larger in the bonding glass portions than in the ferrite core portions, thus, the uneven wear does not prevent the ferrite core portions from contacting the magnetic tape closely. Therefore, degradation of the output level is negligible small in the ferrite head, if the uneven wear occurs.

On the other hand, in the metal head such as the MIG head, a magnetic gap which plays the most important role in recording and reproducing operation is formed between the metal cores. Thus, the metal core portions forming the magnetic gap therebetween readily wears compared with the other parts than the magnetic gap portion owing to lower hardness of the metal portions, which invites degradation of the output level of the metal head because of the spacing loss occurring due to a space between the magnetic gap and the magnetic tape.

Conventionally, in order to decrease the uneven wear produced on the tape contact surface, the abrasive is added into the magnetic layer of the magnetic tape so as to abrade equally the tape contact surface of the magnetic head so far. However, this causes a high degree of wear of the magnetic head, resulting in shortening the life of the magnetic head. When an abrasive made of smaller sized particles is employed in the magnetic layer to decrease the abrading ability of the abrasive, dispersiblity of particles of the abrasive is degraded. This causes the deterioration of the surface flatness of the magnetic tape, resulting in degradation of the electro-magnetic transfer characteristics, in addition, inviting the damage of the tape contact surface of the magnetic head upon operation.

In order to improve the dispersiblity of the small size particles, dispersant may be added into the magnetic paint, however, this dispersant has drawbacks that when the amount of the dispersant added is too small, the particles of the abrasive do not disperse in the magnetic paint throughly, and when the amount of the dispersant is too large, the dispersant seeps out on the surface thereof, i.e., a blooming phenomenon occurs on the surface of the magnetic tape.

SUMMARY OF THE INVENTION

Accordingly, a general object of the present invention is to provide a magnetic recording medium in which the above disadvantages have been eliminated.

A more specific object of the present invention is to provide a magnetic recording medium having excellent durability, high abrasive resistance and smoothness without causing an unacceptable amount of uneven wear on a tape contact surface of a magnetic head.

Another and more specific object of the present invention is to provide a magnetic recording medium comprising a base film and a magnetic layer provided on the base film, the magnetic layer including metal magnetic powder of particles having an average long axis length of not more than 0.13 µm, alumina powder having particles which have an average diameter of not more than 0.13 µm, an $\alpha$-rate of not more than 30% and pH of not more than 7.0, and a binder resin.

Other objects and further features of the present invention will be apparent from the following detailed description.

DETAILED DESCRIPTION OF THE PREFERRED EMBODIMENTS

Figure 1:
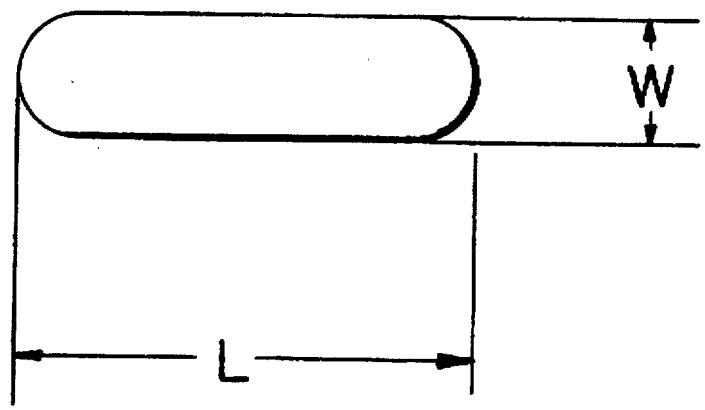
FIG. 1 is a schematic plan view of a magnetic particle used in the present invention.
Figure 2:
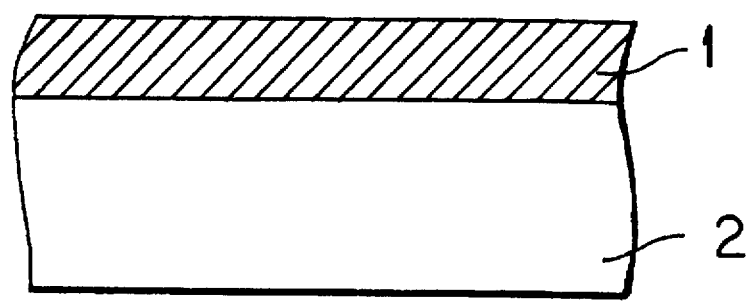
FIG. 2 is a sectional side view of a magnetic tape in the present invention.

Prior to a detailed description of embodiments of the present invention, a description is given of an outline of the present invention in reference to FIGS. 1 and 2.

FIG. 1 is a schematic plan view of a magnetic particle used in the present invention; and FIG. 2 is a sectional side view of a magnetic tape in the present invention.

In FIG. 1, characters "L" and "W" respectively designates an average long axis length and average short axis (or average width) of a magnetic particle. In FIG. 2, numerical characters 1 and 2 respectively designates a magnetic layer and a base film of non-magnetic material.

In the metal magnetic powder employed in the magnetic layer 1 coated on the non-magnetic substrate 2 in the magnetic tape of the present invention, the particles of the metal magnetic powder have an average long axis length "L" of not more than 0.13 μm. The metal magnetic powder is particles mainly composed of elements selected from the group consisting of Fe, Co and Ni. Further, the metal magnetic powder may include other elements such as Si, Ca, Zn, Al, Mn, Cr, Y, B, Nd or La as additives.

When the metal magnetic powder composed of particles having the average long axis length L of more than 0.13 μm is used in the magnetic layer 1 of the magnetic tape, it is impossible to perform a high density magnetic recording on the magnetic tape because of deterioration of a carrier to noise ratio (referred to as C/N) due to degradation of its surface smoothness of the magnetic tape.

On the other hand, when the metal magnetic powder composed of the particles having an average long axis length L of less than 0.04 μm is used in the magnetic layer 1, static magnetic characteristics are deteriorated. Thus, it is preferable to employ the metal magnetic powder of the particles having an average long axis length L of not less than 0.04 μm in the present invention. Further, it is preferable to employ the metal magnetic powder of the particles each having a length/width ratio of 3~15 in view of the magneto-electric transfer characteristics and the dispersiblity of the particles, thus the magnetic particle has about a cigar shape.

As the abrasive used in the present invention, there is employed alumina powder composed of particles having an average diameter of not more than 0.13 μm and having an α-rate of not more than 30% and having pH of not more than 7, wherein the α-rate is defined as a measure of crystallization of an alumina particle, i.e., an alumina particle having the α-rate of 100% means that the alumina particle is crystallized completely.

When the alumina powder of particles having an average diameter of more than 0.13 μm is employed in the magnetic layer 1, the C/N characteristic of the magnetic tape is degraded. Thus, it is preferable to employ the alumina powder of particles having an average diameter of not more than 0.13 μm.

On the other hand, when the alumina powder of particles having an average diameter of less than 0.05 μm is employed, the effectiveness of mechanical reinforcement to the magnetic tape and of the dispersiblity of the particles are degraded, thus it is preferable to employ the alumina powder of the particles having an average diameter of not less than 0.05 μm.

When the alumina powder of particles each having an α-rate of more than 30% is employed, an unacceptable amount of uneven wear is caused to the tape contact surface of the magnetic head because the abrasive ability of the magnetic tape increases, thus, it is preferable to employ the alumina powder of particles having the α-rate of not more than 30%.

Further, when the alumina powder having pH more than 7.0 is employed, the dispersiblity of the particles is degraded due to unknown reason, thus it is preferable to employ the alumina powder having pH of not more than 7.0.

As to an amount of the alumina powder, an amount of the alumina powder of 1.0–15.0 weight %, preferably 3.0–10.0 weight %, to the metal magnetic powder is added in the magnetic layer 1.

When the amount of the alumina powder to be added is less than 1.0 weight %, the durability and the abrasive resistance of the magnetic layer 1 are degraded. On the other hand, when the amount of the alumina powder is more than 15 weight %, the magneto-electric transformation characteristics are degraded, in addition, the life of the magnetic head is shortened.

Furthermore, as to the binders used in the present invention, there are used thermoplastic resin, thermosetting resin, reactive resin and electron beam curing resin. For example, urethane resin, epoxy resin, urea resin, amide resin, silicon resin, polyester resin, phenol resin, vinyl resin, cellulose resin, rubber resin. They are used individually or as mixtures thereof.

In order to improve the dispersiblity of the abrasive, it is preferable to employ binders having a polar group such as sulfonic acid, carboxylic acid, sulfonate or sulfobetaine group.

Next, the embodiment 1 of the magnetic recording medium of the present invention is described in detail.

[Embodiment 1]

TABLE 1

| components of magnetic paint | weight parts (%) |
| --- | --- |
| metal magnetic powder: average long axis length; 0.13 μm Hc; 1850 (Oe) | 100 |
| abrasive (alumna): average diameter; 0.13 μm α-rate; 20% pH; 6.2 | 5 |
| polyurethane resin: | 10 |
| vinyl chroride-vinyl acetate copolymer: | 10 |
| carbon black: | 2 |
| fatty acid (stearic acid): | 1 |
| fatty acid ester (butyl stearate): | 1 |
| toluene: | 100 |
| methyl ethylketone: | 100 |
| cyclohexanone: | 50 |

Table 1 shows components of a magnetic paint to be coated on a base film 2 as a magnetic layer 1 in an embodiment 1 of the present invention.

After the above components were mixed and dispersed by using a sand mill for 4 hours, a magnetic paint was obtained by adding polyisocyanate curing agent of 6 weight % therein. This magnetic paint was coated on a base film 2 of polyethylene terephthalate having a thickness of 5 μm to form a magnetic layer 1 having a thickness of 1.5 μm. After drying, calendering and curing processes, the magnetic tape of the embodiment 1 was obtained by cutting the base film 2 into a predetermined width.

Each of the magnetic tapes of embodiments 2~11 and comparatives 1~11 was obtained by changing the value of the average long axis length L of particles contained in the metal magnetic powder and the values of the average diameter, α-ratio and pH of the particles contained in the alumina powder, other conditions being maintained as they were.

Before tape running tests, the C/N characteristics of the magnetic tapes of the embodiments 1~11 and comparatives 1~11 were measured by using a VHS (one of the industry standard system) deck.

Then, an amount of uneven wear caused to the surface of the test magnetic head after a 2-hour tape running test, and scratches formed on the surface of the testing magnetic tape after a 100-hour tape running test were measured respectively to evaluate the abrasive ability and the mechanical strength of the testing magnetic tape in such a manner as mentioned hereinafter. The results are shown in Table 2.

Further, the magnetic tapes employing alumina powder having pH of more than 7, for instance, the comparatives 7 and 8 show also unsatisfactory values of C/N. This reason is considered that the particles of the alumina powder were not adequately dispersed in the magnetic layer 1 by unknown reason. This causes the particles of alumina powder to aggregate locally and thus invited degradation of the surface condition of the magnetic tape.

Wear of the magnetic heads due to the magnetic tapes were tested of the embodiments 1~11 and the comparatives 1~11 by using the VHS deck equipped with test heads as follows.

As the test heads, there were used metal laminated heads each having the same tape contact surface of which an overall width was 80 μm. The tape contact surface was made

TABLE 2

| | mag. pow. | alumina powder | | | | characteristics | | | |
|---|---|---|---|---|---|---|---|---|---|
| | av. long ax. (μm) | W.P. (%) | av. d. (μm) | α-ra. (%) | pH | C/N (dB) | s.h. (nm) | O.P (−dB) | tape scra. |
| emb. 1 | 0.13 | 5 | 0.1 | 20 | 6.2 | 56 | 8 | 0.70 | B |
| 2 | 0.1 | 5 | 0.1 | 20 | 6.2 | 62 | 2 | 0.21 | B |
| 3 | 0.06 | 5 | 0.1 | 20 | 6.2 | 64 | 4 | 0.41 | B |
| 4 | 0.13 | 1 | 0.13 | 30 | 7 | 59 | 4 | 0.40 | B |
| 5 | 0.13 | 3 | 0.13 | 30 | 7 | 58 | 3 | 0.31 | B |
| 6 | 0.13 | 10 | 0.13 | 30 | 7 | 57 | 6 | 0.55 | A |
| 7 | 0.13 | 15 | 0.13 | 30 | 7 | 55 | 9 | 0.85 | A |
| 8 | 0.06 | 1 | 0.05 | 30 | 5.8 | 62 | 3 | 0.30 | B |
| 9 | 0.1 | 10 | 0.1 | 30 | 7 | 58 | 4 | 0.36 | B |
| 10 | 0.1 | 10 | 0.05 | 30 | 7 | 57 | 3 | 0.28 | B |
| 11 | 0.1 | 10 | 0.1 | 10 | 5.8 | 56 | 2 | 0.16 | A |
| com. 1 | 0.18 | 5 | 0.1 | 20 | 6.2 | 50 | 12 | 1.36 | B |
| 2 | 0.13 | 0.5 | 0.13 | 30 | 7 | 63 | 2 | 0.20 | D |
| 3 | 0.13 | 20 | 0.13 | 30 | 7 | 48 | 25 | 2.46 | A |
| 4 | 0.1 | 10 | 0.16 | 30 | 7 | 53 | 38 | 3.72 | B |
| 5 | 0.1 | 10 | 0.1 | 70 | 6.8 | 57 | 42 | 4.11 | A |
| 6 | 0.1 | 10 | 0.1 | 90 | 6.5 | 58 | 51 | 4.86 | A |
| 7 | 0.13 | 10 | 0.13 | 30 | 8.3 | 51 | 58 | 5.64 | A |
| 8 | 0.13 | 10 | 0.05 | 30 | 8.3 | 43 | 72 | 6.87 | B |
| *9 | 0.13 | α 10 | 0.13 | — | 7.1 | 48 | 46 | 4.62 | B |

*comparative 9 employs α-Fe₂O₃ powder as the abrasive instead of alumina powder.
Note (abbreviation): emb. (embodiment); com. (comparative); av. long ax. (average long axis length L of particles) W.P. (weight parts); av. d. (average diameter of particles); α-ra. (α-rate); s.h. (step height); D.O. (decrease of output level); and tape scra. (tape surface scratch).

The measurements of C/N of the initial condition regarding the magnetic tapes of the embodiments 1~11 and the comparatives 1~9 were performed respectively by using the VHS deck as follows.

After a sine wave signal of 10 MHz was recorded on each of the magnetic tapes with a standard magnetic head by applying an optimum recording current thereto, the recorded signal on the magnetic tape was reproduced with the standard magnetic head. The value of C/N was obtained by calculating a ratio of a signal output level measured at the frequency of 10 MHz to a noise level measured at a frequency different from that of the sine wave signal by 1 MHz.

As seen from Table 1, all the embodiments 1~11 show satisfactory values of C/N of more than 55 dB. Thus, there is no problem for the magneto-electric transformation characteristics of the magnetic tapes of the embodiment 1~11, however, the comparative 1 shows an unsatisfactory value of C/N of 50 dB. This reason is considered that the average long axis length L of the particles of the metal magnetic powder is too long compared with those of the embodiments 1~11.

of an amorphous laminated core portion having a width of 20 μm in which a magnetic gap is formed, and a ceramic portion having a width of 60 μm.

An amount of uneven wear of the test head was determined by measuring a height of step developed at a junction line formed with the amorphous laminated portion and the ceramic portion nearby the magnetic gap after a 120-minute tape running test under an environment of temperature of 20° C. and humidity of 10%.

As seen from Table 2, regarding the magnetic tapes of the embodiments 1~11, a height of a step developed at the junction line in each of the test heads was less than 10 nm. However, with respect to the magnetic tapes of the comparatives 5, 6 which contain alumina powder having high α-rates of 70 and 80%, respectively, the height of step produced in the respective test heads was more than 40 nm. Thus, in both the comparatives 5 and 6, decreases of the output levels of the reproduced signals are larger due to spacing losses compared with those of the magnetic tapes having α-rate of less than 30%, for instance, as seen in the embodiment 6.

The above decrease of output level of the reproduced signal was measured through the test head as follows.

At first, after two tape cassettes each housing the same testing magnetic tape were prepared, an initial output level of the testing magnetic tape was measured before conducting a tape running test by recording and reproducing a sine wave signal of 10 M Hz on and from a predetermined test range of the testing magnetic tape housed in one of the two tape cassettes.

After the test head had undergone a 2-hour tape running test by another tape cassette, the output level of the test head was measured again in the same manner as mentioned above, using the same predetermined test range of the former tape cassette. The decrease of output level of the testing head due to the uneven wear is shown as a ratio of the output level obtained after the 2-hour tape running test to the initial output level of the test head with respect to the testing magnetic tapes of the embodiments 1~11 and the comparatives 1~9.

The mechanical strength or durability of the testing magnetic tape against scratches or damages produced on the surface thereof was evaluated by using an increasing rate of signal dropouts occurring in reproduction due to the scratches or damages thereof. The increasing rate of signal dropouts of the testing magnetic tape was determined as a ratio of the numbers of signal dropouts detected after a 100-hour tape running test under the environment of temperature of 20° C. and humidity of 60% to the numbers of signal dropouts detected at an initial condition of the testing magnetic tape without the tape running test. The increasing rate of signal dropouts is classified into 4 ranks by using 4-step evaluation method composed of rank A (0%), rank B (less than 5%), rank C (5 to less than 20%) and rank D (20 to 50%), wherein the numeral values in parenthesisses designate the increasing rates of the signal dropouts.

In the above 4-step evaluation method, both the rank A and B are considered to be acceptable in the present invention.

As seen from Table 2, all the testing magnetic tapes except for the comparative 2 of the rank D fall into the acceptable ranks above or equal to the rank B, thus they have acceptable mechanical strength or durability against the tape surface damage or scratch thereof. From the fact that the weight ratio of the alumina powder of the comparative 2 is 0.5%, the weight ratio of the alumina powder to the metal magnetic powder is determined to be not less than 1 weight % in the present invention.

As mentioned in the foregoing, according to the magnetic recording medium of the present invention, it is able to obtain the magnetic recording medium having excellent durability, abrasive resistance and flatness capable of suppressing development of uneven wear on the tape contact surfaces of the magnetic heads to the minimum.

What is claimed is:

1. A magnetic recording medium comprising:

a base film; and a magnetic layer provided on the base film, the magnetic layer including metal magnetic powder of acicular particles having an average long axis length of not more than 0.13 μm, alumina powder of particles which have an average diameter of not more than 0.13 μm, an α-rate of not more than 30% and pH of not more than 7.0, and a binder resin, wherein the weight rate of the alumina powder to the metal magnetic powder is 1.0 to 15.0 weight %.

2. A magnetic recording medium as claimed in claim 1, wherein the metal magnetic powder includes particles mainly composed of elements selected from the group consisting of Fe, Co and Ni.

3. A magnetic recording medium as claimed in claim 1, wherein the average long axis length of particles of the metal magnetic powder is not less than 0.04 μm.

4. A magnetic recording medium as claimed in claim 1, wherein the average diameter of the particles of the alumina powder is not less than 0.05 μm.

5. A magnetic recording medium as claimed in claim 1, wherein the weight ratio of the alumina powder to the metal magnetic powder is 3.0–10.0 weight %.

6. A magnetic recording medium as claimed in claim 1, wherein the binder resin contains at least a polar group, selected from the group consisting of a sulfonic acid, carboxylic acid, sulfonate and sultobetaine group.

* * * * *